US008228096B2

(12) United States Patent
Nishi

(10) Patent No.: US 8,228,096 B2
(45) Date of Patent: Jul. 24, 2012

(54) CIRCUIT AND METHOD FOR CURRENT-MODE OUTPUT DRIVER WITH PRE-EMPHASIS

(75) Inventor: Yoshinori Nishi, Sunnyvale, CA (US)

(73) Assignee: Kawasaki Microelectronics, Inc., Chiba (JP)

( * ) Notice: Subject to any disclaimer, the term of this patent is extended or adjusted under 35 U.S.C. 154(b) by 0 days.

(21) Appl. No.: 11/712,914

(22) Filed: Mar. 2, 2007

(65) Prior Publication Data

US 2008/0218222 A1 Sep. 11, 2008

(51) Int. Cl.
*H03K 3/00* (2006.01)
*H03K 19/094* (2006.01)
*H03K 5/01* (2006.01)

(52) U.S. Cl. ............. 327/108; 327/170; 326/83; 326/86

(58) Field of Classification Search .......... 327/108–112, 327/170, 436, 437; 326/62, 63, 82, 83, 86
See application file for complete search history.

(56) References Cited

U.S. PATENT DOCUMENTS

| | | | |
|---|---|---|---|
| 4,827,260 A * | 5/1989 | Sugawa et al. ................ 341/118 |
| 5,023,609 A | 6/1991 | Reich | |
| 6,266,379 B1 | 7/2001 | Dally | |
| 6,373,346 B1 | 4/2002 | Kobayashi | |
| 6,590,432 B1 | 7/2003 | Wu et al. | |
| 6,759,868 B2 | 7/2004 | Helt et al. | |
| 6,888,389 B2 * | 5/2005 | Baba ............................. 327/261 |
| 6,897,685 B2 * | 5/2005 | Sato ................................ 326/86 |
| 6,940,302 B1 | 9/2005 | Shumarayev et al. | |
| 7,313,187 B2 | 12/2007 | Chang | |
| 7,443,211 B2 * | 10/2008 | Liu ............................... 327/108 |
| 7,486,112 B2 | 2/2009 | Tanaka | |
| 2005/0057280 A1 * | 3/2005 | Groen et al. ..................... 326/86 |
| 2007/0013411 A1 * | 1/2007 | Asaduzzaman et al. ........ 326/83 |
| 2007/0046332 A1 * | 3/2007 | Tanaka ........................... 326/83 |
| 2007/0057702 A1 * | 3/2007 | Suenaga ....................... 327/108 |

OTHER PUBLICATIONS

Landman, Paul, et al. "A Transmit Architecture with 4-Tap Feedforward Equalization for 6.25/12.5Gb/s Serial Backplane Communications." *Digest of Technical Papers*, 2005 IEEE International Solid-State Circuits Conference. Feb. 7, 2005. pp. 66-67, 585.

* cited by examiner

*Primary Examiner* — Lincoln Donovan
*Assistant Examiner* — Colleen O Toole
(74) *Attorney, Agent, or Firm* — Oliff & Berridge, PLC

(57) ABSTRACT

An output driver circuit including a pre-driver stage that receives a first data signal, the pre-driver stage including a plurality of first differential pairs that perform current subtraction to output a second data signal based on the first data signal, and an output driver stage electrically coupled to the pre-driver stage that receives the second data signal from the pre-driver stage, the output driver stage including a plurality of second differential pairs that transmit an output signal along transmission lines.

22 Claims, 8 Drawing Sheets

CIRCUIT AND METHOD FOR CURRENT-MODE OUTPUT DRIVER WITH PRE-EMPHASIS

BACKGROUND

Aspects of the invention generally relate to high-speed communication devices. More specifically, the invention can relate to a driver circuit with pre-emphasis.

Gb/s-class high-speed communication devices that operate at a broad range of frequencies, consume a low amount of power, and reside on a small footprint of silicon are of great use. Such communication devices have advantages in serial communication applications, such as Peripheral Component Interconnect Express (PCIe), Serial Advanced Technology Attachment (SATA), and the like, as well as broader applications, such as networks, telecommunications, and other electronic systems.

SUMMARY

In serial communication applications, integrated circuits (ICs) are typically mounted on a printed circuit board and are electrically coupled to each other by a plurality of printed circuit board (PCB) conductors, commonly known as traces. Traces provide a transmission media for signals, such as power, ground references, and input/output signals to and from each IC. Normally, high-frequency signals between ICs via the traces are adversely affected by parasitic resistance, inductance, and capacitance inherent in such interconnections.

Further, impedance mismatches between an IC transmitter and the various signal transmission media (traces and other printed circuit board components) of the signal transmission path, as well as between an IC receiver and the various signal transmission media of the signal transmission path may produce signal reflections at the transmitter end and/or the receiver end of the signal transmission path. Such signal reflections may propagate along the transmission path and may potentially degrade system performance. As a result, it is highly desirable to closely match the output impedance of the transmitting IC to the various components including the signal transmission path, and the input impedance of the receiving IC. Generally, transmitters are designed for an output impedance of 50 Ohms to match the characteristic impedance of the PCB trace.

Additionally, in order to compensate for the high-frequency signal attenuation inherent in the traces, a technique called pre-emphasis can be implemented. Pre-emphasis can be used to compensate for the high-frequency signal attenuation by emphasizing periods of transition and de-emphasizing periods of no transition in a time-varying serial data signal.

FIG. 1 shows an output driver with an exemplary analog current subtraction circuit that implements such a pre-emphasis technique. As shown, the current subtraction circuit includes two differential pairs A and B connected in parallel. Differential pair A includes transistors $T_{11}$ and $T_{12}$ with their sources connected to each other and to a first current source $S_1$. The drain electrodes of transistors $T_{11}$ and $T_{12}$ are connected to output resistances $R_1$ and $R_2$, respectively. Output resistances $R_1$ and $R_2$ represent transmission lines or traces on a printed circuit board, and are both typically 50 Ohms in most high-speed applications above 2 Gb/s. The differential pair B, which is added for pre-emphasis, includes transistors $T_{13}$ and $T_{14}$ with their source electrodes connected to a second current source $S_2$. The drain electrodes of the transistors $T_{13}$ and $T_{14}$ are also connected to output resistances $R_1$ and $R_2$, respectively. Furthermore, drain electrode of transistor $T_{11}$ is connected to drain of transistor $T_{13}$, forming an output node $V_{OUT\_B}$. Likewise, drain of transistor $T_{12}$ is connected to drain of transistor $T_{14}$, forming an output node $V_{OUT}$. Input nodes $V_{IN}$, $V_{IN\_B}$, $EV_{IN\_B}$, and $EV_{IN}$ are located at the gates of transistors $T_{11}$, $T_{12}$, $T_{13}$ and $T_{14}$, respectively.

FIG. 2 shows a wave-form diagram depicting the relationship between the signals applied to input nodes $V_{IN}$, $V_{IN\_B}$, $EV_{IN\_B}$, and $EV_{IN}$ and the output signals measured at output nodes $V_{OUT}$ and $V_{OUT\_B}$. FIG. 2 is used to generally explain the concept of pre-emphasis. As shown in FIG. 2, a data signal is applied to input node $V_{IN}$, and, in an inverted form, is synchronously applied to input node $V_{IN\_B}$. Further, the data signal, delayed by a unit interval or by one period of the transmitted data rate, is applied to input node $EV_{IN}$, and, in an inverted and similarly delayed form, is applied to input node $EV_{IN\_B}$. All data signals applied to input nodes $V_{IN}$, $V_{IN\_B}$, $EV_{IN}$, and $EV_{IN\_B}$ have a set amplitude value 'a.' As described below, the data signals can be emphasized by an amount 'b' over the set amplitude value 'a', or de-emphasized by an amount 'b' below the set amplitude value 'a.'

In FIG. 2, as the data signal at input node $V_{IN}$ transitions from either "low" to "high" or "high" to "low," the output signal at output node $V_{OUT}$ is emphasized by an amount 'b.' During periods of no transition in the data signal at input node $V_{IN}$, the output signal at output node $V_{OUT}$ is de-emphasized by amount 'b.' Referring to FIG. 2, as the input signal at input node $V_{IN}$ transitions from "high" to "low" at t2, the output signal at output node $V_{OUT}$ transitions to an "emphasized low," which is a "low" signal emphasized by an amount 'b.' However, at time t3, since the signal at $V_{IN}$ does not transition and remains "low," the "emphasized low" signal at $V_{OUT}$ is de-emphasized by an amount 'b,' and becomes a "de-emphasized low." When the signal at $V_{IN}$ transitions from "low" to "high" at time t4, the signal at $V_{OUT}$ transitions from a "de-emphasized low" to an "emphasized high," where the "emphasized high" is a "high" signal that is emphasized by an amount 'b.' At time t5, since there is no change in the signal at $V_{IN}$, the signal at $V_{OUT}$ is de-emphasized from an "emphasized high" to a "de-emphasized high." At time t6, as the signal at $V_{IN}$ transitions from "high" to "low," the signal at $V_{OUT}$ transitions from a "de-emphasized high" to an "emphasized low." And finally at time t7, as the signal at $V_{IN}$ transitions from "low" to "high," the signal at $V_{OUT}$ transitions from an "emphasized low" to an "emphasized high."

One exemplary type of pre-emphasis scheme applied to the circuit topology of FIG. 1 is described below with reference to Table 1.

TABLE 1

| Channel width of differential pair A | Channel width of differential pair B | Total load capacitance | $I_1$ | $I_2$ | $I_2/I_1$ |
|---|---|---|---|---|---|
| 100% | 0% | 100% | 100% | 0% | 0% |
| 100% | 10% | 110% | 100% | 10% | 10% |
| 100% | 20% | 120% | 100% | 20% | 20% |
| 100% | 30% | 130% | 100% | 30% | 30% |
| 100% | 40% | 140% | 100% | 40% | 40% |

Table 1 shows currents $I_1$ and $I_2$ passing through differential pairs A and B, respectively, as well as the pre-emphasis ratio $I_2/I_1$. The channel width, capacitance, and current values are in terms of a percentage of respective arbitrary values. The current subtraction scheme of FIG. 1 maintains a constant current value of 100% for $I_1$. Differential pair B is added for pre-emphasis. Differential pair B can be set to maintain a maximum current value of 40% for $I_2$. However, because $I_1$ is at a constant 100%, adding differential pair B for pre-emphasis can create severe bandwidth limitations because of the additional load capacitance introduced by differential pair B. For example, in order to maintain a pre-emphasis ratio of 40%, the current $I_2$ flowing through differential pair B must be maintained at 40% of current $I_1$. Thus, the total channel width of transistors $T_{13}$ and $T_{14}$ of differential pair B must be 40% of the total channel width of transistors $T_{11}$ and $T_{12}$ of differential pair A. The 40% increase of the total channel width area in the output driver amounts to a 40% increase in total load capacitance, which lowers the impedance of the output driver, and results in mismatch at high frequencies, causing severe bandwidth limitations.

The total load capacitance issue of FIG. 1, however, can be somewhat eased by maintaining the total amount of current $I_1+I_2$ constant. Another circuit topology schematically identical to the current subtraction circuit of FIG. 1, but implementing a different pre-emphasis scheme, is described below with respect to Table 2. The channel width, capacitance, and current values in Table 2 are also in terms of a percentage of respective arbitrary values. Specifically, as shown in Table 2, the total current $I_1+I_2$ through both differential pairs A and B can be maintained at the same level by adjusting the current flow through both differential pairs A and B. Conventionally, it is desirable to design a tunable differential pair A with a channel width of 100% so as to be able to tune current $I_1$ passing through differential pair A. By decreasing current $I_1$ to 71%, it is possible to maintain a pre-emphasis ratio of 40% by adding differential pair B having current $I_2$ at 29%. However, because the total channel width of differential pair A remains at 100% and the total channel width of differential pair B is at 29%, the total load capacitance is still too large at 129%. Thus, Although this scheme allows for the same amount of pre-emphasis ratio $I_2/I_1$ with differential pair B having a smaller channel width, this type of pre-emphasis scheme implementation is only a marginal improvement over the previous pre-emphasis scheme implementation.

TABLE 2

| Channel width of differential pair A | Channel width of differential pair B | Total load capacitance | $I_1$ | $I_2$ | $I_2/I_1$ |
| --- | --- | --- | --- | --- | --- |
| 100% | 0% | 100% | 100% | 0% | 0% |
| 100% | 9% | 109% | 91% | 9% | 10% |
| 100% | 17% | 117% | 83% | 17% | 20% |
| 100% | 23% | 123% | 77% | 23% | 30% |
| 100% | 29% | 129% | 71% | 29% | 40% |

One method of circumventing the load capacitance issue of the previous two pre-emphasis schemes of Tables 1 and 2 as applied to FIG. 1 is to use a Digital to Analog Converter (DAC) configuration for the pre-emphasis scheme. FIG. 3 shows such a DAC pre-emphasis scheme with current subtraction performed in the output stage. This DAC pre-emphasis scheme was presented in 2005 ISSCC, digest of technical papers, vol. 48 3.4 "*A Transmit Architecture with 4-Tap Feedfoward Equalization for 6.25/12.5 Gb/s Serial Backplane Communications*," Paul Landman et. al. By using a DAC configuration, it is possible to use all output stages at all times, with or without pre-emphasis. Utilizing all output stages (slices) eliminates redundancy at the output and thus eliminates any unwanted capacitance.

As shown in FIG. 3, each of the ten slices 401 to 410 contains a differential pair. Each differential pair includes two transistors $T_{41}$ and $T_{42}$, with their sources connected to each other and to a current source $S_{41}$. The drains of each of the two transistors $T_{41}$ and $T_{42}$ are connected to output resistances $R_{41}$ and $R_{42}$, respectively. Moreover, all of the differential pairs of each respective slice 401 to 410 are connected in parallel, and therefore drive the same output resistances $R_{41}$ and $R_{42}$. Each pair of transistors of each slice 401 to 410 are connected to their respective pre-driver circuit 421 to 430. Each pre-driver circuit 421 to 430 can either supply a non-delayed data signal or a delayed data signal and drive each respective slice 401 to 410 of the output driver. Each pre-driver circuit 421 to 430 also supplies the delayed or non-delayed data in an inverted and non-inverted form to the appropriate transistors.

In the case of FIG. 3, six pre-driver circuits 421 to 426 supply non-delayed data, and four pre-driver circuits 427 to 430 supply delayed data. Each current source $S_{41}$ of every slice 401 to 410 draws an equal portion of the total current. Accordingly, if there are ten slices 401 to 410 in the output driver, each current source $S_{41}$ will draw one tenth of the total current. Without any pre-emphasis, each of the slices 401 to 410 is driven by its respective pre-driver circuit set to supply non-delayed data, with 100% of the total current being pulled from all slices 401 to 410. For example, in order to create a pre-emphasis ratio of 66.6%, six of the ten pre-driver circuits 421 to 426 are set to drive six respective slices 401 to 406 with a non-delayed data signal, and the remaining four of the ten pre-driver circuits 427 to 430 are set to drive the other four respective slices 407 to 410 with a delayed data signal. Thus, 60% of the total current is pulled from the six slices 401 to 406 driven with a non-delayed data signal, and 40% of the total current is pulled from the four slices 407 to 410 driven with a delayed data signal. As a result, the total current pulled remains 100%, without any increase in capacitance.

However, the DAC pre-emphasis scheme has its own drawbacks, such as redundancy in the pre-driver stage. With N slices 401 to N, N pre-driver circuits are required to drive the N slices in the output stage. However, as the number of pre-driver circuits increases to drive more slices, the size of pre-driver circuits must be reduced in order to meet power and area constraints. As the size of each pre-driver circuit decreases, the effect of parasitic capacitance becomes more prominent, resulting in bandwidth limitation. In order to compensate for these detrimental effects, each slice 401 to N can be designed to pull more than 1/N of the total current from each slice. For example, when driving ten slices 401 to 410, to compensate for parasitic capacitance, each slice 401 to 410 is fabricated having a total channel width much larger than that required to pull only 1/10 of the total current. Increasing the channel width of the slices in the output driver stage, however, results in greater current consumption, higher power dissipation, higher capacitive loads, and a larger silicon area.

Aspects of the invention reduce or remove the area and power penalties, as well as the extra capacitive loading issues described above by implementing a pre-emphasis scheme with the current subtraction performed in the pre-driver stage. By performing current subtraction in the pre-driver stage instead of the output driver stage, the invention can minimize or remove the additional capacitive loading due to large differential pairs in the output driver of FIG. 1 and the segmented pre-driver circuits of FIG. 3.

BRIEF DESCRIPTION OF THE DRAWINGS

The embodiments of the invention will be described with reference to the following drawings, wherein like numerals designate like elements, and wherein.

DETAILED DESCRIPTION OF EMBODIMENTS

In the following descriptions, many of the exemplary circuits are shown to include n-channel metal-oxide-semiconductor field-effect transistors (MOSFETs) in a variety of configurations. While MOSFET devices are used by example, the disclosed circuits may be implemented using any number of other transistor types, such as J-FETs, bipolar transistors, and the like. Additionally, while n-channel devices are used in the following examples, the same general approaches may also apply to circuits incorporating p-channel FETs or PNP bipolar transistors, for example.

Still further, while the terms "drain" and "source" are used for ease of explanation and to adhere to traditional engineering usage, it should be recognized that a drain and source of a FET transistor may be considered interchangeable, and for the following descriptions merely thought of as a first end and a second end of a semiconductor channel unless otherwise stated or apparent to one of ordinary skill in the art.

Figure 1:
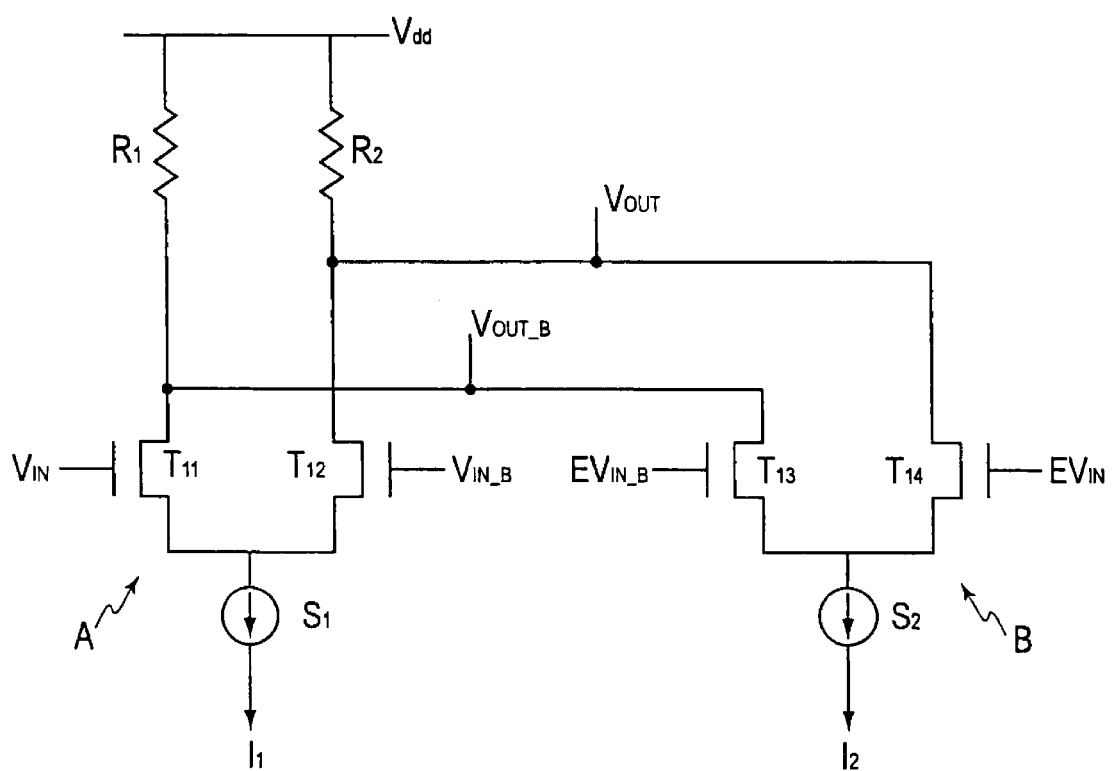
FIG. 1 shows a block diagram of a pre-emphasis scheme with analog current subtraction performed in an output driver stage.
Figure 2:
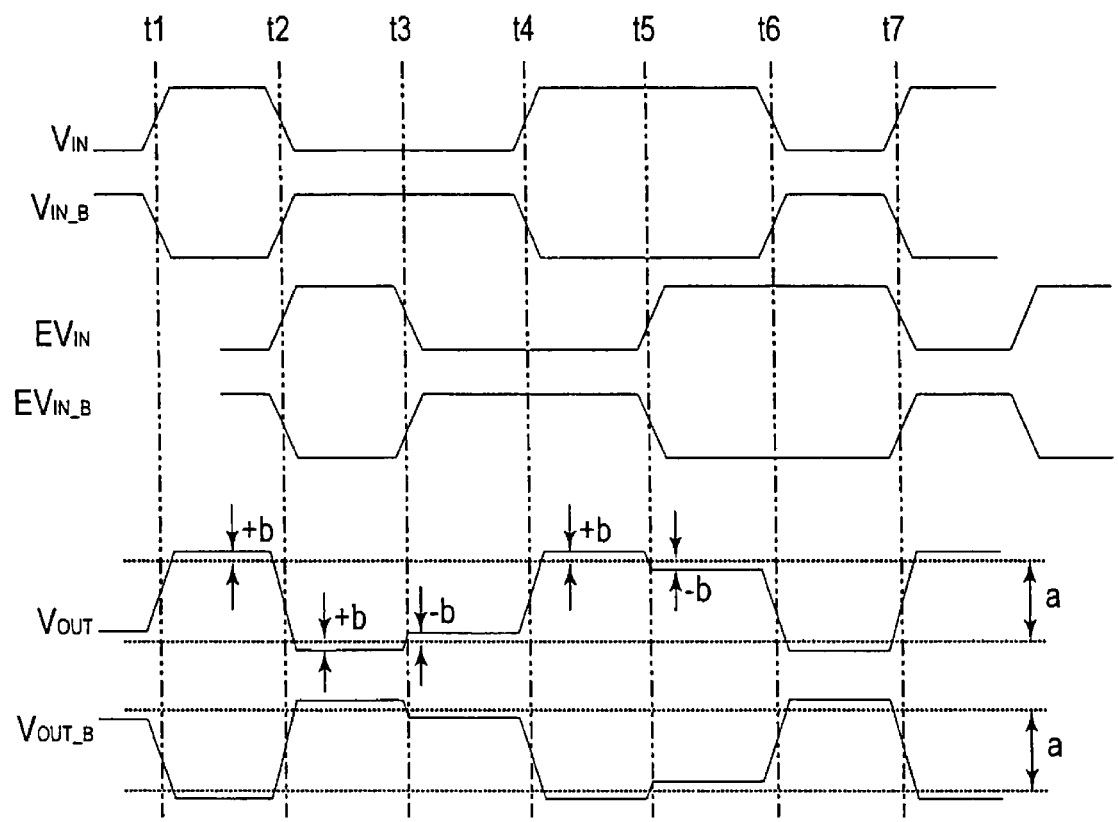
FIG. 2 shows a signal wave-form showing pre-emphasis by subtraction.
Figure 3:
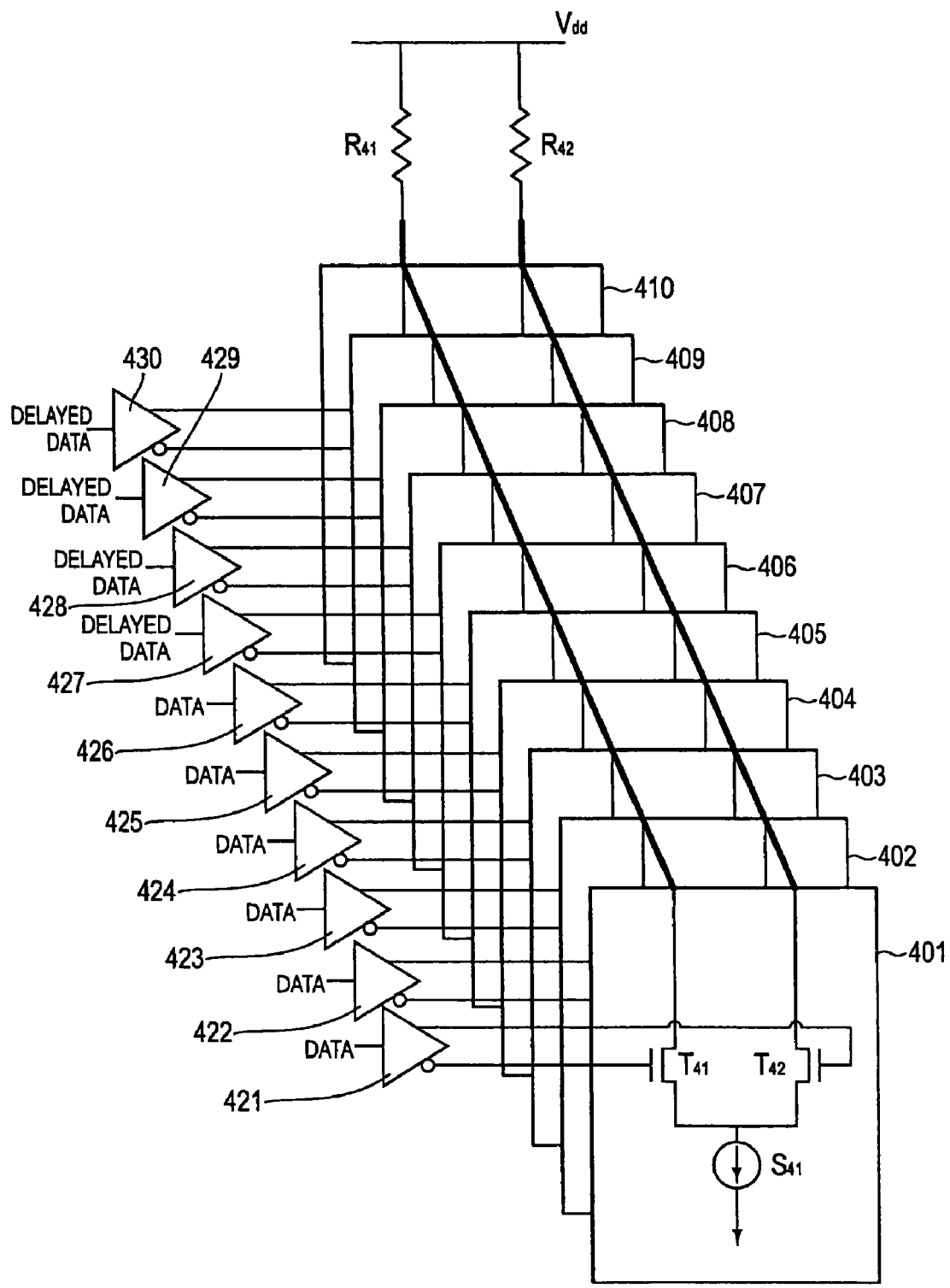
FIG. 3 shows an exemplary DAC configuration of an analog current subtraction scheme.
Figure 4:
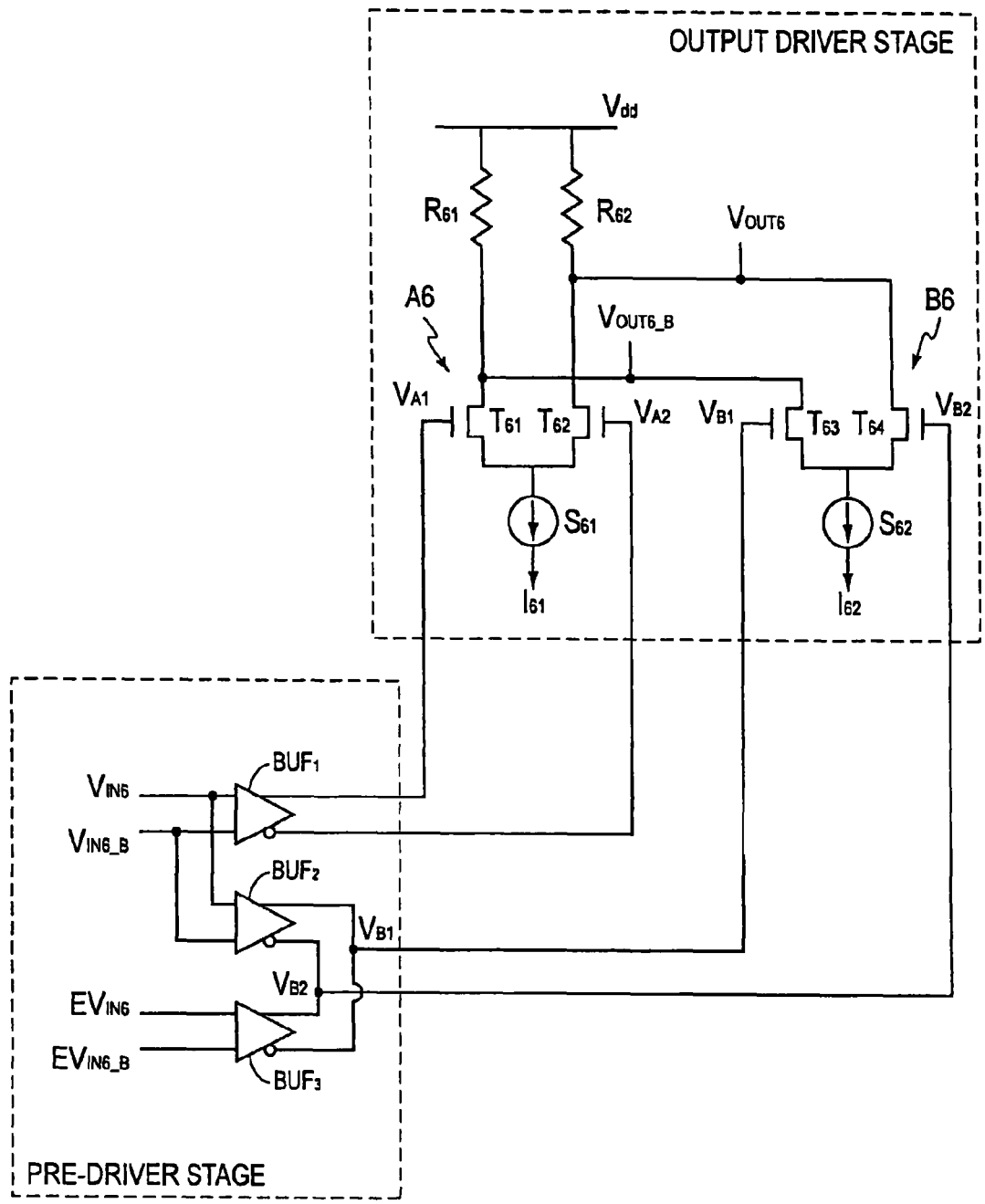
FIG. 4 shows a first exemplary pre-emphasis scheme with current subtraction performed in the pre-driver stage.

FIG. 4 shows a first exemplary embodiment of a pre-emphasis circuit having current subtraction performed in the pre-driver stage. As shown in FIG. 4, the output driver stage can include a current addition circuit having two differential pairs A6 and B6 that are connected in parallel. Differential pair A6 can include transistors $T_{61}$ and $T_{62}$ with their source electrodes connected to each other and to a first current source $S_{61}$. The drain electrodes of the transistors $T_{61}$ and $T_{62}$ are connected to output resistances $R_{61}$ and $R_{62}$, respectively. Nodes $V_{A1}$, $V_{A2}$, $V_{B1}$, and $V_{B2}$ are located at the gate electrodes of transistors $T_{61}$, $T_{62}$, $T_{63}$, and $T_{64}$, respectively. The output resistances $R_{61}$ and $R_{62}$ are the termination resistors for impedance matching. Differential pair B6 can include transistors $T_{63}$ and $T_{64}$ with their sources connected to a second current source $S_{62}$. The drains of the transistors $T_{63}$ and $T_{64}$ are also connected to output resistances $R_{61}$ and $R_{62}$, respectively. Furthermore, the drain of transistor $T_{61}$ is connected to the drain of transistor $T_{63}$. Likewise, the drain of transistor $T_{62}$ is connected to the drain of transistor $T_{64}$.

Differential pairs A6 and B6 can be current mode differential pairs whose inputs are given by either small-signal current-mode logic or rail to rail CMOS logic.

As shown in FIG. 4, first buffer $BUF_1$, second buffer $BUF_2$, and third buffer $BUF_3$ make up the pre-driver stage and drive differential pairs A6 and B6, respectively. Specifically, $BUF_1$ drives differential pair A6, and $BUF_2$ and $BUF_3$ drive second differential pair B6. Buffers $BUF_1$ and $BUF_2$ each receive a non-inverted data signal at node $V_{IN6}$ and an inverted data signal at node $V_{IN6\_B}$. $BUF_3$ receives a non-inverted delayed data signal at node $EV_{IN6}$, and an inverted delayed data signal at node $EV_{IN6\_B}$. $BUF_1$ drives differential pair A6 by supplying the non-inverted data signal to node $V_{A1}$ and the inverted data signal to node $V_{A2}$. $BUF_2$ and $BUF_3$ are described in greater detail below with respect to FIG. 5.

Figure 5:
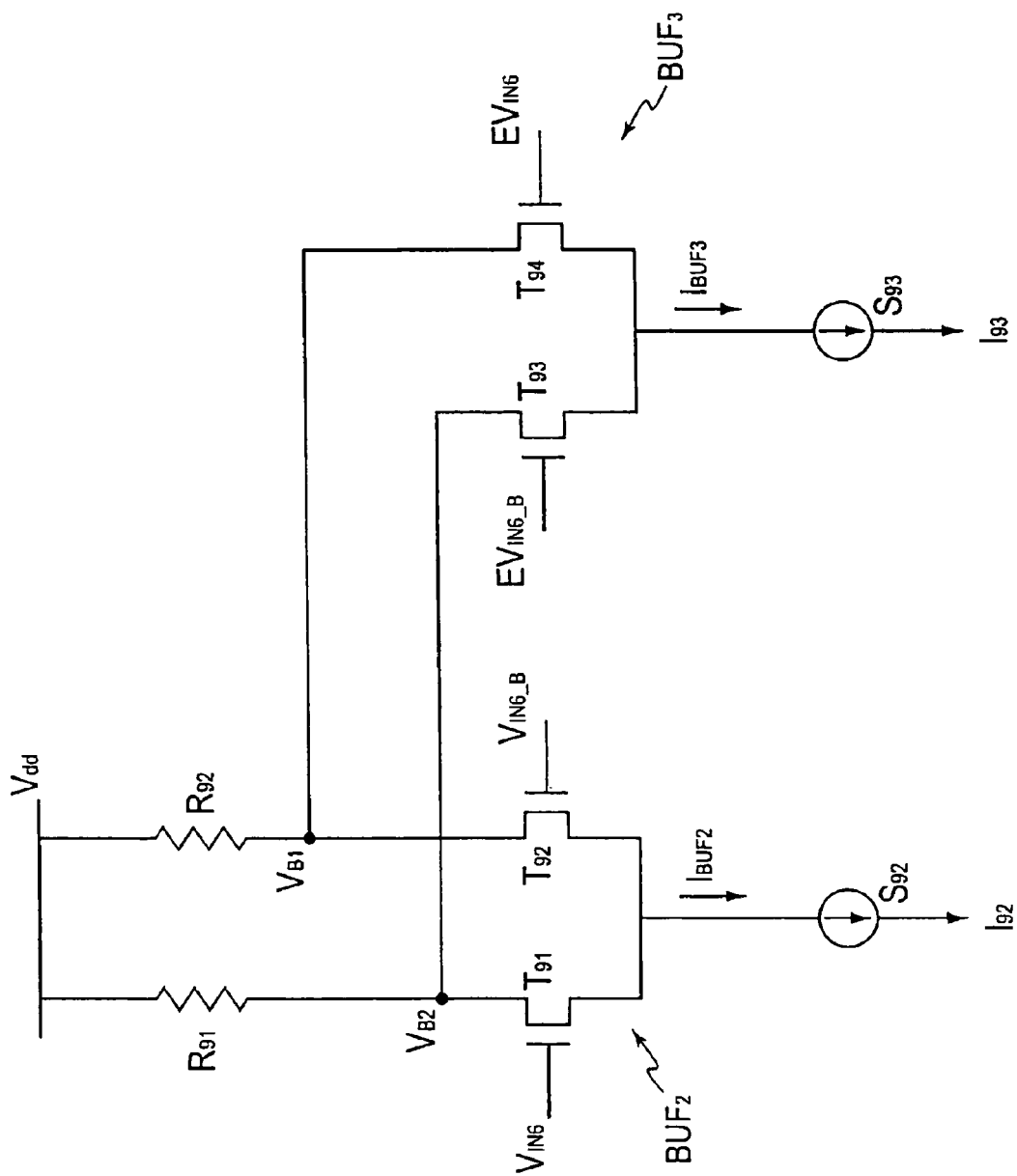
FIG. 5 shows an exemplary schematic of the second and third buffers $BUF_2$ and $BUF_3$ in the pre-driver stage of the first exemplary pre-emphasis scheme.

FIG. 5 shows an exemplary schematic diagram of second and third buffers $BUF_2$ and $BUF_3$ in the pre-driver stage. As shown in FIG. 5, $BUF_2$ and $BUF_3$ are in the form of two differential pairs connected in parallel. $BUF_2$ includes transistors $T_{91}$ and $T_{92}$ with their sources connected to each other and to a variable current source $S_{92}$. The drains of transistors $T_{91}$ and $T_{92}$ are connected to resistors $R_{91}$ and $R_{92}$, respectively. $BUF_3$ includes transistors $T_{93}$ and $T_{94}$ with their sources connected to another variable current source $S_{93}$. The drains of the transistors $T_{93}$ and $T_{94}$ are also connected to resistors $R_{91}$ and $R_{92}$, respectively. Furthermore, the drain of transistor $T_{91}$ is connected to the drain of transistor $T_{93}$, forming an output node $V_{B2}$, which is the same node located at the gate of transistor $T_{64}$ of differential pair B6. Likewise, the drain of transistor $T_{92}$ is connected to the drain of transistor $T_{94}$, forming an output node $V_{B2}$, which is the same node located at the gate of transistor $T_{63}$ of differential pair B6. Input nodes $V_{IN6}$, $V_{IN6\_B}$, $EV_{IN6\_B}$, and $EV_{IN6}$ are located at the gates of transistors $T_{91}$, $T_{92}$, $T_{93}$, and $T_{94}$, respectively, and correspond to input nodes $V_{IN6}$, $V_{IN6\_B}$, $EV_{IN6\_B}$, and $EV_{IN6}$ of $BUF_1$, $BUF_2$, and $BUF_3$ in FIG. 4.

Variable current source $S_{92}$ can be tuned to pull a predetermined fraction of current $I_{BUF2}$ from $BUF_2$. Likewise, variable current source $S_{93}$ can be tuned to pull a predetermined fraction of current $I_{BUF3}$ from $BUF_3$. While FIG. 5 only shows one variable current source for each buffer, it should be understood that any number and type of variable current sources may be provided for each buffer. For example, variable current source $S_{93}$ can be an n-channel transistor having the voltage at its gate electrode regulated by an external circuit, or the like.

Each of the current sources $S_{92}$ and $S_{93}$ can be tuned to regulate the amount of current pulled from each of $BUF_2$ and $BUF_3$. By regulating currents $I_{BUF2}$ and $I_{BUF3}$, it is possible to tune the pre-emphasis value in the pre-driver stage.

With reference to FIG. 4 and Table 3 below, for purposes of illustration, differential pair A6 is sized to pull a maximum of 60% of the overall current in the output driver stage and differential pair B6 is sized to pull a maximum of 40% of the overall current in the output driver stage. An overall ratio will be determined by tuning currents $I_{BUF2}$ and $I_{BUF3}$ in the pre-driver stage. The overall ratio is determined by the following equation:

$$A_{od} + (B_{od})(C_2):(B_{od})(C_3)$$

where $A_{od}$ is the current ratio of the current $I_{61}$ passing through differential pair A6 to the overall current in the output driver stage; $B_{od}$ is the current ratio of current $I_{62}$ passing through the differential pair B6 to the overall current in the output driver stage; $C_2$ is the current ratio of current $I_{BUF2}$ passing through $BUF_2$ to the overall current in the pre-driver stage; and $C_3$ is the current ratio of the current $I_{BUF3}$ passing through $BUF_3$ to the overall current in the pre-driver stage.

Table 3 shows current ratios $C_2$ and $C_3$ with $A_{od}$ set to 60% and $B_{od}$ set to 40%. A percentage amount by which a data signal is emphasized or de-emphasized is the percentage amount substantially equivalent to $(B_{od})(C_3)$.

TABLE 3

| $A_{od}$ | $B_{od}$ | $C_2$ | $C_3$ | $(A_{od}) + (B_{od})(C_2)$ | $(B_{od})(C_3)$ |
|---|---|---|---|---|---|
| 60% | 40% | 100% | 0% | 100% | 0% |
| 60% | 40% | 80% | 20% | 92% | 8% |
| 60% | 40% | 60% | 40% | 84% | 16% |
| 60% | 40% | 40% | 60% | 76% | 24% |
| 60% | 40% | 20% | 80% | 68% | 32% |
| 60% | 40% | 0% | 100% | 60% | 40% |

During operation, $BUF_1$ is constantly driving differential pair A6. $BUF_2$ and $BUF_3$ perform subtraction between the data signal and the delayed data signal. In order to tune the pre-driver stage so as to have no pre-emphasis, variable current source $S_{92}$ can be tuned to pull 100% of current $I_{BUF2}$, and variable current source $S_{93}$ can be tuned to pull 0% of current $I_{BUF3}$. In such a case, since no current is passing through $BUF_3$, and all current is passing through $BUF_2$, the overall current through the pre-driver is equivalent to current $I_{BUF2}$ passing through $BUF_2$. Thus, the current ratio $C_2$ of current $I_{BUF2}$ to the overall current in the pre-driver stage will be 100%, and the current ratio $C_3$ of current $I_{BUF3}$ to the overall current in the pre-driver stage will be 0%.

This pre-emphasis technique allows for any amount of pre-emphasis with little or no performance degradation. Some pre-emphasis settings are shown in Table 3. For example, as shown in Table 3, if one desires for the data signal to be emphasized/de-emphasized by 24%, one can tune current source $S_{92}$ to pull 40% of current $I_{BUF2}$ and tune current source $S_{93}$ to pull 60% of current $I_{BUF3}$. As a result, an output signal will be emphasized by 24% during periods of transition, and de-emphasized by 24% during periods of no transition.

During implementation of this exemplary embodiment, because no extra load capacitance is added at the outputs $V_{OUT6}$ and $V_{OUT6\_B}$ of the output driver stage, the output driver stage maintains a low level of capacitance, differential pairs A6 and B6 accommodate 100% of the maximum current at the output driver stage, the number of signals from the pre-driver stage remains small, and the absence of numerous small pre-drivers reduces the performance degradation due to excessive parasitic capacitance.

Figure 6:
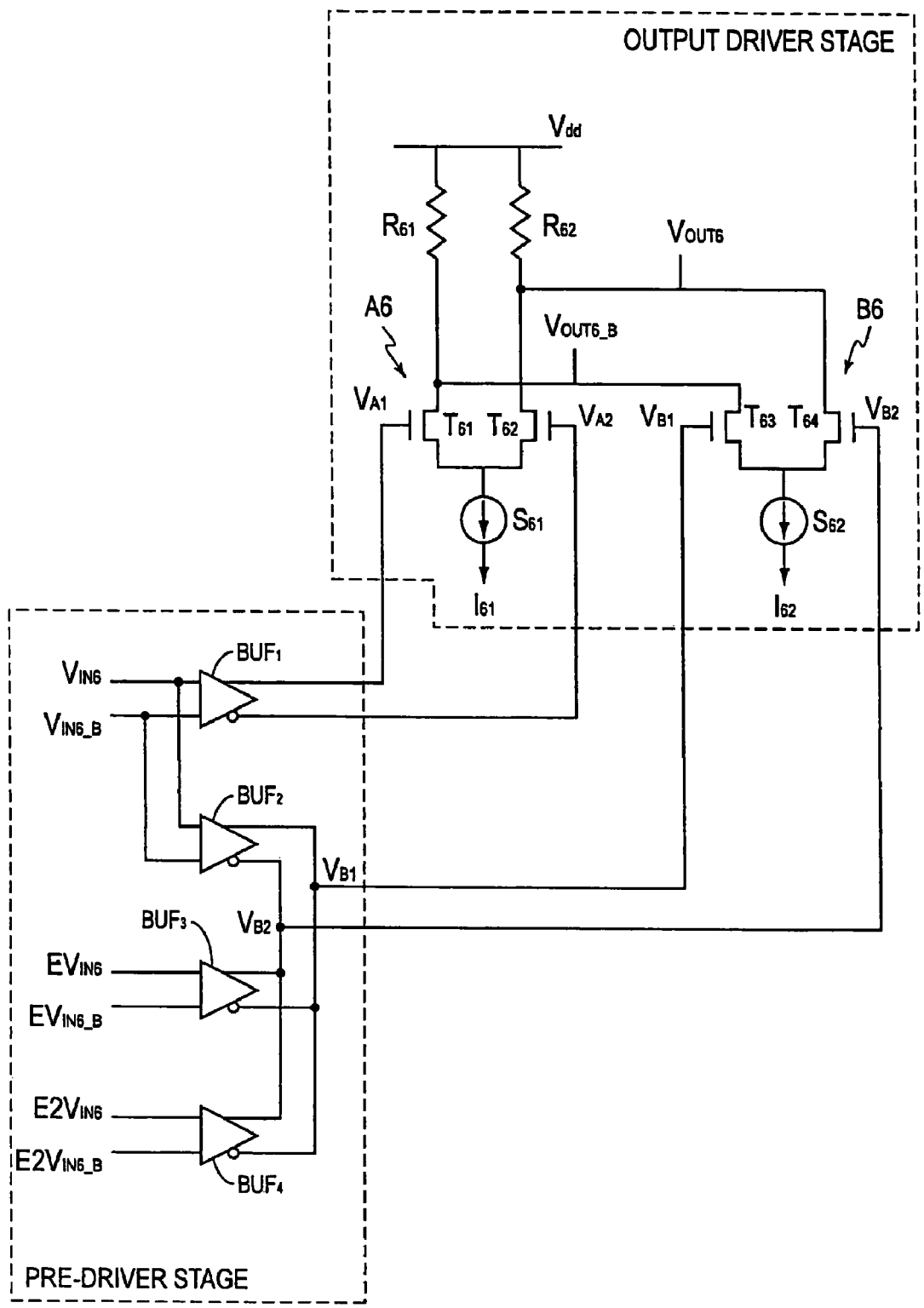
FIG. 6 shows a second exemplary pre-emphasis scheme with multiple input delays.

This technique can also be applied to the inputs with multiple delays, so as to compensate for complex response over the transmission medium. FIG. 6 shows a possible implementation for such cases.

FIG. 6 shows a second exemplary embodiment, which is FIG. 4 enhanced with an additional buffer $BUF_4$ in the pre-driver stage for a multiple bit-delayed input signal.

Figure 7:
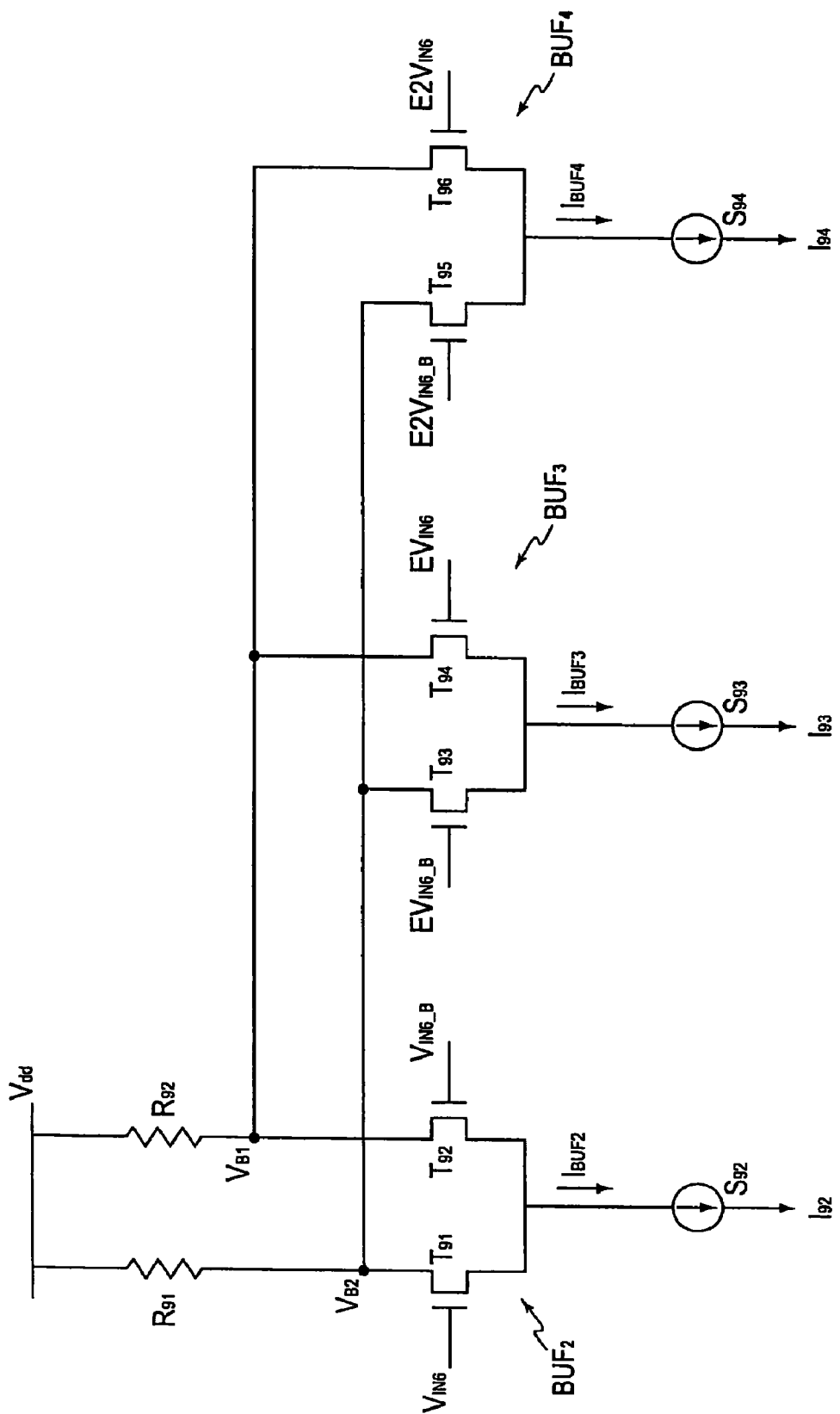
FIG. 7 shows an exemplary schematic of the second, third, and fourth buffers $BUF_2$, $BUF_3$, and $BUF_4$ in the pre-driver stage of the second exemplary pre-emphasis scheme.

As shown in FIG. 7, buffer $BUF_4$ includes transistors $T_{95}$ and $T_{96}$ with their sources connected to each other and to a variable current source $S_{94}$. The drains of transistors $T_{95}$ and $T_{96}$ are connected to resistors $R_{91}$ and $R_{92}$, respectively. Furthermore, the drains of transistors $T_{91}$ and $T_{93}$ are connected to the drain of transistor $T_{95}$, forming output node $V_{B1}$, which is the same node located at the gate of transistor $T_{63}$ of differential pair B6. Likewise, the drains of transistors $T_{92}$ and $T_{94}$ are connected to the drain of transistor $T_{96}$, forming an output node $V_{B2}$, which is the same node located at the gate of transistor $T_{64}$ of differential pair B6. Input nodes $E2V_{IN6\_B}$, and $E2V_{IN6}$ are located at the gates of transistors $T_{95}$ and $T_{96}$, respectively, and correspond to the input nodes $E2V_{IN6\_B}$ and $E2V_{IN6}$ of $BUF_4$ in FIG. 6.

$BUF_4$ receives a non-inverted delayed data signal at node $E2V_{IN6}$, and an inverted delayed data signal at node $E2V_{IN6\_B}$. The non-inverted delayed data signal and the inverted delayed data signal received at nodes $E2V_{IN6}$ and $E2V_{IN6\_B}$ of $BUF_4$, respectively, are the original non-inverted and inverted data signals $V_{IN6}$ and $V_{IN6\_B}$ that are delayed by a second delay time. The second delay time can be equivalent to two unit intervals or two periods of the transmitted data rate and is greater than the delay time of the data signals received at nodes $EV_{IN6}$ and $EV_{IN6\_B}$ of $BUF_3$.

$BUF_4$ allows the output signal to be additionally de-emphasized during a period of no transition. For example, after signal $V_{IN6}$ transitions to either a "high" or a "low" and then does not transition for a period equal to the second delay, the output signal $V_{OUT6}$ is de-emphasized by an additional amount proportional to the current ratio $C_4$ of current $I_{BUF4}$ to the overall current in the pre-driver stage.

Table 4 shows current ratios $C_2$, $C_3$, and $C_4$ with $A_{od}$ set to 60% and $B_{od}$ set to 40% for illustrative purposes. A percentage amount by which a data signal is emphasized or de-emphasized after the first delay is the percentage amount substantially equivalent to half of $(B_{od})(C_3)$. A percentage amount by which a data signal is additionally de-emphasized after the second delay is the percentage amount substantially equivalent to $(B_{od})(C_4)$.

TABLE 4

| $A_{od}$ | $B_{od}$ | $C_2$ | $C_3$ | $C_4$ | $(A_{od}) + (B_{od})(C_2)$ | $(B_{od})(C_3)$ | $(B_{od})(C_4)$ |
|---|---|---|---|---|---|---|---|
| 60% | 40% | 100% | 0% | 0% | 100% | 0% | 0% |
| 60% | 40% | 50% | 50% | 0% | 80% | 20% | 0% |
| 60% | 40% | 50% | 40% | 10% | 80% | 16% | 4% |
| 60% | 40% | 25% | 60% | 15% | 70% | 24% | 6% |
| 60% | 40% | 0% | 75% | 25% | 60% | 30% | 10% |

During operation of the second exemplary embodiment shown in FIG. 6, $BUF_1$ is constantly driving differential pair A6. $BUF_2$, $BUF_3$, and $BUF_4$ perform subtraction between the data signal, the delayed data signal, and the multiple bit-delayed signal. In order to tune the pre-driver stage so as to have no pre-emphasis, current source $S_{92}$ can be tuned to pull 100% of current $I_{BUF2}$, current source $S_{93}$ can be tuned to pull 0% of current $I_{BUF3}$, and current source $S_{94}$ can also be tuned to pull 0% of current $I_{BUF4}$. In such a case, since no current is passing through $BUF_3$ and $BUF_4$, and 100% of current is passing through $BUF_2$, the overall current through the pre-driver is equivalent to current $I_{BUF2}$ passing through $BUF_2$. Thus, the current ratio $C_2$ of current $I_{BUF2}$ to the overall current in the pre-driver stage will be 100%, the current ratio $C_3$ of current $I_{BUF3}$ to the overall current in the pre-driver stage will be 0%, and the current ratio $C_4$ of current $I_{BUF4}$ to the overall current in the pre-driver stage will be 0%.

Some pre-emphasis settings for the pre-emphasis scheme depicted in FIG. 6 are shown in Table 4. For example, as shown in Table 4, if one desires for the data signal to be emphasized/de-emphasized by 12% with a second delay de-emphasis during no transition of 6%, one can tune current source $S_{92}$ to pull 25% of current $I_{BUF2}$, tune current source $S_{94}$ to pull 60% of current $I_{BUF3}$, and tune current source $S_{93}$ to pull 15% of current $I_{BUF4}$. As a result, an output signal will be emphasized by 12% during periods of transition, and de-emphasized by 12% during periods of no transition after the first delay. After the second delay during a period of no transition, the signal will be additionally de-emphasized by 6%.

During implementation of this second exemplary embodiment, because no extra load capacitance is added at the outputs $V_{OUT6}$ and $V_{OUT6\_B}$ of the output driver stage, the output driver stage maintains a low level of capacitance, differential pairs A6 and B6 accommodate 100% of the maximum current at the output driver stage, the number of signals from the pre-driver stage remains small, and the absence of numerous small pre-drivers reduces the performance degradation due to excessive parasitic capacitance.

Of course, more buffers may be added in order to compensate for high-loss and more complex responses over the transmission medium.

Figure 8:
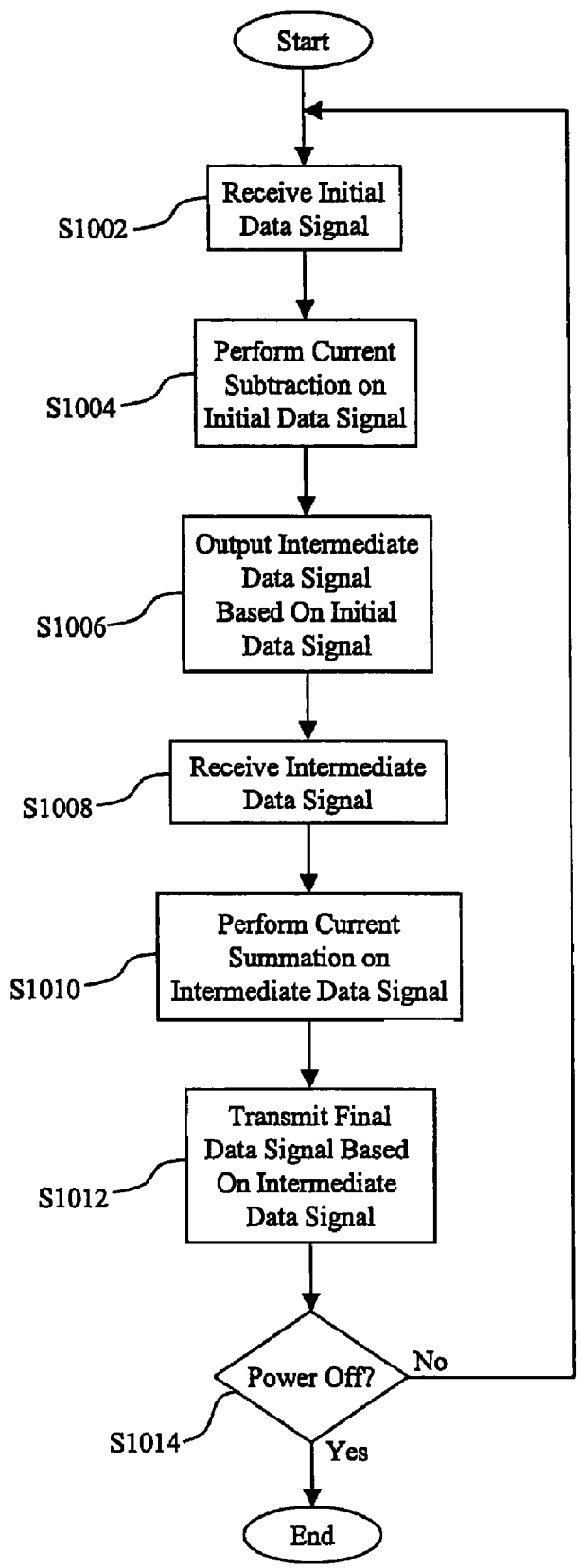
FIG. 8 shows a flow-chart of an exemplary pre-emphasis process.

FIG. 8 shows a flow-chart of an exemplary pre-emphasis process. The exemplary pre-emphasis process can be implemented in a circuit where current subtraction is performed in the pre-driver stage, such as the pre-emphasis scheme shown in FIG. 4.

The process begins and proceeds to step S1002 where the process receives an initial data signal, and proceeds to step S1004. For example, in the pre-emphasis scheme shown in FIG. 4, buffers $BUF_1$, $BUF_2$, and $BUF_3$ in the pre-driver stage receive input signals at nodes $V_{IN6}$, $V_{IN6\_B}$, $EV_{IN6\_B}$, and $EV_{IN6}$.

In step S1004, the process performs current subtraction on the initial data signal, and proceeds to step S1006. For example, in the pre-emphasis scheme shown in FIG. 4, buffers $BUF_2$, and $BUF_3$ perform current subtraction on input signals received at nodes $V_{IN6}$, $V_{IN6\_B}$, $EV_{IN6\_B}$, and $EV_{IN6}$.

In step S1006, the process outputs an intermediate data signal based on the initial data signal, and proceeds to step SI 008. For example, in the pre-emphasis scheme shown in FIG. 4, the signal processed by the buffers in the pre-driver stage is outputted to differential pairs A6 and B6 in the output driver stage.

In step S1008, the process receives the intermediate data signal, and proceeds to step S1010. For example, in the pre-emphasis scheme shown in FIG. 4, differential pairs A6 and B6 in the output driver stage receive signals at nodes $V_{A1}$, $V_{A2}$, $V_{B1}$, and $V_{B2}$.

In step S1010, the process performs current summation on the intermediate data signal, and proceeds to step S1012. For example, in the pre-emphasis scheme shown in FIG. 4, differential pairs A6 and B6 perform current summation on input signals received at nodes $V_{A1}$, $V_{A2}$, $V_{B1}$, and $V_{B2}$.

In step S1012, the process transmits a final data signal based on the intermediate data signal, and proceeds to step S1014. For example, in the pre-emphasis scheme shown in FIG. 4, the output driver outputs signals at nodes $V_{OUT6}$ and $V_{OUT6\_B}$.

In step S1014, the process determines whether the circuit implementing the pre-emphasis process is powered off. If the circuit is not powered off, then the process returns to step S1002. Otherwise, the process ends.

As has been shown, the invention introduces the flexibility in setting the pre-emphasis ratio without adding extra capacitance at the outputs. The present invention makes this possible by handling the current subtraction in the pre-driver stage and current summation at the output driver stage.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An output driver circuit comprising:
   a first pre-driver stage that receives a first data signal and generates a buffered first data signal;
   a second pre-driver stage that receives the first data signal, the second pre-driver stage including a plurality of first differential pairs that perform current subtraction of a first data signal delayed by a predetermined time from the first data signal to output a second data signal; and
   an output driver stage electrically coupled to the pre-driver stages that receives the buffered first data signal and the second data signal from the pre-driver stages, the output driver stage including a plurality of second differential pairs that perform current summation of the buffered first data signal from the first pre-driver stage and the second data signal from the second pre-driver stage to transmit an output signal, which is a pre-emphasized signal of the first data signal, along transmission lines.

2. The output driver circuit of claim 1, wherein an amount of pre-emphasis of the output signal is varied by varying a first ratio of currents passing through the plurality of first differential pairs without varying a second ratio of currents passing through the plurality of second differential pairs.

3. The output driver circuit of claim 1, the plurality of first differential pairs of the second pre-driver stage being current-mode differential pairs whose inputs are driven by small signal current mode logic.

4. The output driver circuit of claim 1, the plurality of first differential pairs of the second pre-driver stage being current-mode differential pairs whose inputs are driven by rail-to-rail CMOS logic.

5. The output driver circuit of claim 1, the plurality of first differential pairs of the second pre-driver stage having a functionality of selecting a desired ratio of a plurality of inputs of the respective first differential pairs.

6. A method of varying an amount of pre-emphasis on a data signal, comprising:
   receiving a first data signal at a first pre-driver stage that generates a buffered first data signal;
   outputting a second data signal based on a current subtraction of a first data signal delayed by a predetermined time from the first data signal via a plurality of first differential pairs of a second pre-driver stage;
   receiving the buffered first data signal and the second data signal at an output driver stage; and
   outputting an output signal, which is a pre-emphasized signal of the first data signal, based on a current summation of the buffered first data signal and the second data signal via a plurality of second differential pairs of the output driver stage.

7. The method of varying an amount of pre-emphasis according to claim 6, further comprising:
   varying an amount of pre-emphasis by varying a first ratio of currents passing through the plurality of first differential pairs without varying a second ratio of currents passing through the plurality of second differential pairs.

8. The method of performing varying an amount of pre-emphasis according to claim 6, further comprising:
   connecting at least a pair of the plurality of second differential pairs of the output driver so as to form a current summation circuit.

9. The method of varying an amount of pre-emphasis according to claim 6, further comprising:
   driving inputs of the plurality of first differential pairs of the second pre-driver stage by small signal current mode logic.

10. The method of varying an amount of pre-emphasis according to claim 6, further comprising:
    driving inputs of the plurality of first differential pairs of the second pre-driver stage by rail-to-rail CMOS logic.

11. The method of varying an amount of pre-emphasis according to claim 6, further comprising:

selecting a desired ratio of a plurality of inputs of the respective first differential pairs.

12. The output driver circuit of claim 1, wherein the buffered first data signal generated by the first pre-driver stage is identical to the first data signal received by the first pre-driver stage.

13. The method of varying an amount of pre-emphasis according claim 6, wherein the buffered first data signal generated by the first pre-driver stage is identical to the first data signal received by the first pre-driver stage.

14. The output driver circuit of claim 1, wherein the first data signal delayed by the predetermined time includes a plurality of first data signals delayed by different predetermined times.

15. The method of varying an amount of pre-emphasis according to claim 6, wherein the first data signal delayed by the predetermined time includes a plurality of first data signals delayed by different predetermined times.

16. The output driver circuit of claim 2, wherein the plurality of second differential pairs are sized to pull respective maximum currents and the amount of pre-emphasis of the output signal is varied while passing the respective maximum currents through the plurality of second differential pairs.

17. The method of varying an amount of pre-emphasis according to claim 7, wherein the plurality of second differential pairs are sized to pull respective maximum currents and the varying the amount of pre-emphasis is performed while passing the respective maximum currents through the second differential pairs.

18. An output driver circuit comprising:
a first pre-driver stage that receives a first data signal and generates a buffered first data signal;
a second pre-driver stage that receives the first data signal;
the second pre-driver stage including a plurality of first differential pairs that perform current subtraction of a first data signal delayed by a predetermined time from the first data signal to output a second data signal, at least one of the plurality of first differential pairs of the second pre-driver stage being coupled to at least one of a plurality of variable current sources; and
an output driver stage electrically coupled to the pre-driver stages that receives the buffered first data signal and the second data signal from the pre-driver stages, the output driver stage including a plurality of second differential pairs that perform current summation of the buffered first data signal from the first pre-driver stage and the second data signal from the second pre-driver stage to transmit an output signal, which is a pre-emphasized signal of the first data signal, along transmission lines,
wherein the output signal is a pre-emphasized signal of the first data signal and an amount of pre-emphasis of the output signal is varied by varying a first ratio of currents passing through the plurality of first differential pairs without varying a second ratio of currents passing through the plurality of second differential pairs.

19. The output driver circuit of claim 18, wherein the plurality of second differential pairs are sized to pull respective maximum currents and the amount of pre-emphasis of the output signal is varied while passing the respective maximum currents through the plurality of second differential pairs.

20. The output driver circuit of claim 1, wherein a first ratio of currents passing through the differential pairs of the second pre-driver stage is set to one of a plurality of ratios including 100%:0% and 0%:100% so that an amount of pre-emphasis of the output signal is varied.

21. The method of varying an amount of pre-emphasis according to claim 6, wherein an amount of pre-emphasis of the output signal is varied by setting a first ratio of currents passing through the differential pairs of the second pre-driver stage to one of a plurality of ratios including 100%:0% and 0%:100%.

22. The output driver circuit of claim 18, wherein the amount of pre-emphasis of the output signal is varied by varying the first ratio of the currents passing through the plurality of first differential pairs from 100%:0% to 0%:100%.

* * * * *